(12) United States Patent
Oosawa

(10) Patent No.: US 7,346,198 B2
(45) Date of Patent: Mar. 18, 2008

(54) INTER-IMAGE OPERATION APPARATUS AND METHOD AND IMAGE DISPLAY APPARATUS AND METHOD

(75) Inventor: Akira Oosawa, Kaisei-machi (JP)

(73) Assignee: FUJIFILM Corporation, Tokyo (JP)

( * ) Notice: Subject to any disclaimer, the term of this patent is extended or adjusted under 35 U.S.C. 154(b) by 590 days.

(21) Appl. No.: 09/774,577

(22) Filed: Feb. 1, 2001

(65) Prior Publication Data
US 2001/0010732 A1 Aug. 2, 2001

(30) Foreign Application Priority Data
Feb. 1, 2000 (JP) ............... 2000-024069

(51) Int. Cl.
G06K 9/00 (2006.01)
(52) U.S. Cl. ............ 382/128; 382/305; 378/26
(58) Field of Classification Search ........ 382/128, 382/129, 130, 131, 132, 133, 134, 275, 312, 382/169, 182, 189, 209, 243, 274, 282, 305, 382/168, 192; 250/505.1, 493.1, 491.1; 604/501, 604/502, 503; 600/427, 407, 109; 709/206; 378/26
See application file for complete search history.

(56) References Cited

U.S. PATENT DOCUMENTS 4,558,462 A * 12/1985 Horiba et al. ............ 382/275
5,151,795 A * 9/1992 Adachi ..................... 382/128
5,359,513 A * 10/1994 Kano et al. ............... 382/128
5,379,757 A * 1/1995 Hiyama et al. ........... 600/109
5,877,819 A * 3/1999 Branson ................... 348/701
5,878,746 A * 3/1999 Lemelson et al. ........ 600/407
5,882,330 A * 3/1999 Lemelson ................. 604/503
6,424,996 B1 * 7/2002 Killcommons et al. ... 709/206

FOREIGN PATENT DOCUMENTS

JP  7-37074  2/1995

* cited by examiner

Primary Examiner—Seyed Azarian
(74) Attorney, Agent, or Firm—Sughrue Mion, PLLC

(57) ABSTRACT

An inter-image operation apparatus has temporal subtraction means for calculating a temporal subtraction image from two or more sets of base image data, and history data recording means for recording history data concerning the calculated temporal subtraction image in a database server and concurrently attaching the same history data to the data on the temporal subtraction image. The history data may include information identifying the two or more base images, the date of calculating the temporal subtraction image, the ID number of the patient, the name of the photographed portion of the patient, the photographing angle of the patient, etc. A desired temporal subtraction image may be immediately fetched from the database server by referring to the history data attached thereto if that temporal subtraction image had already been obtained, instead of recalculating that temporal subtraction image. Thus, the diagnostic process of comparing two or more images of an identical object can be carried out efficiently.

59 Claims, 7 Drawing Sheets

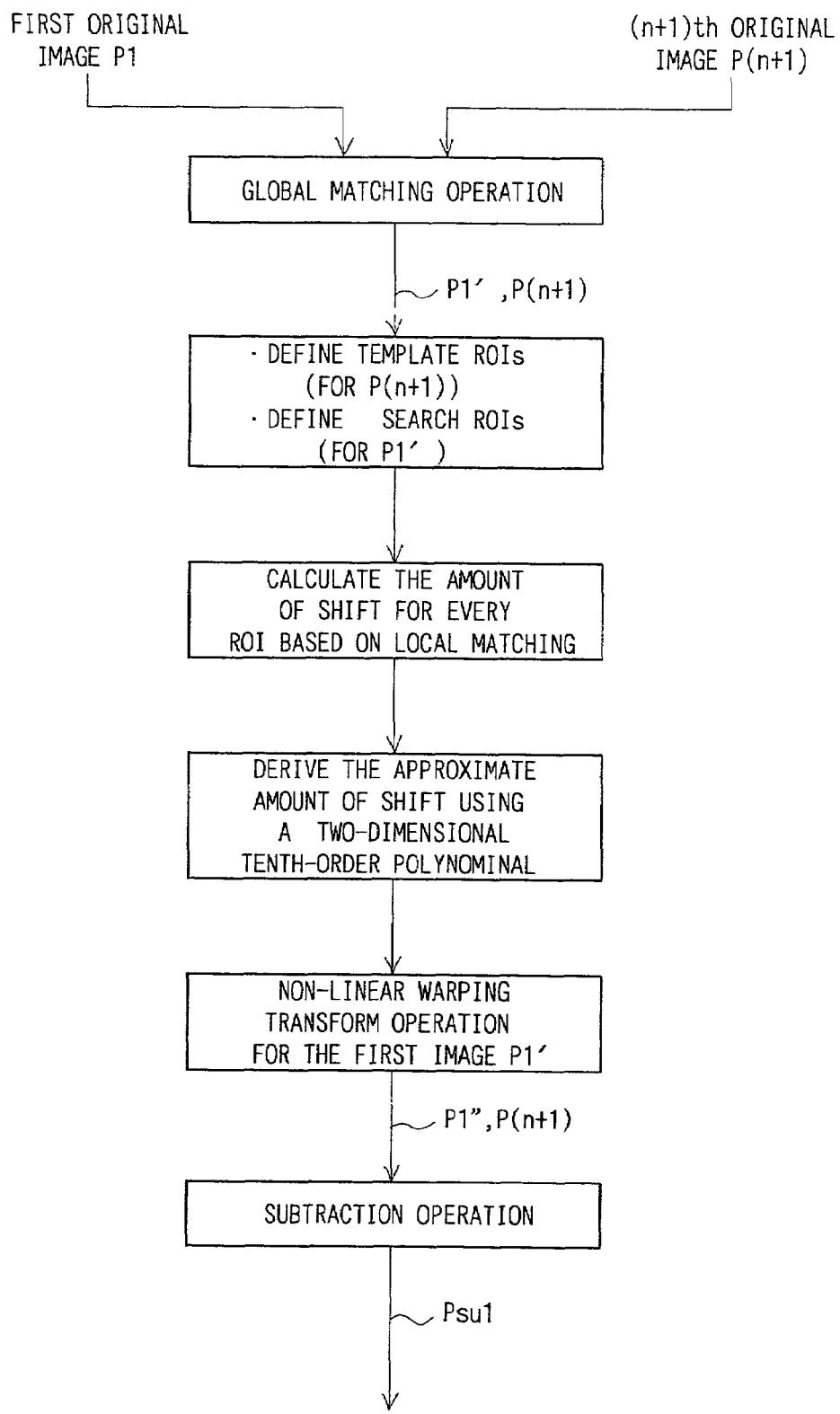
F I G. 3

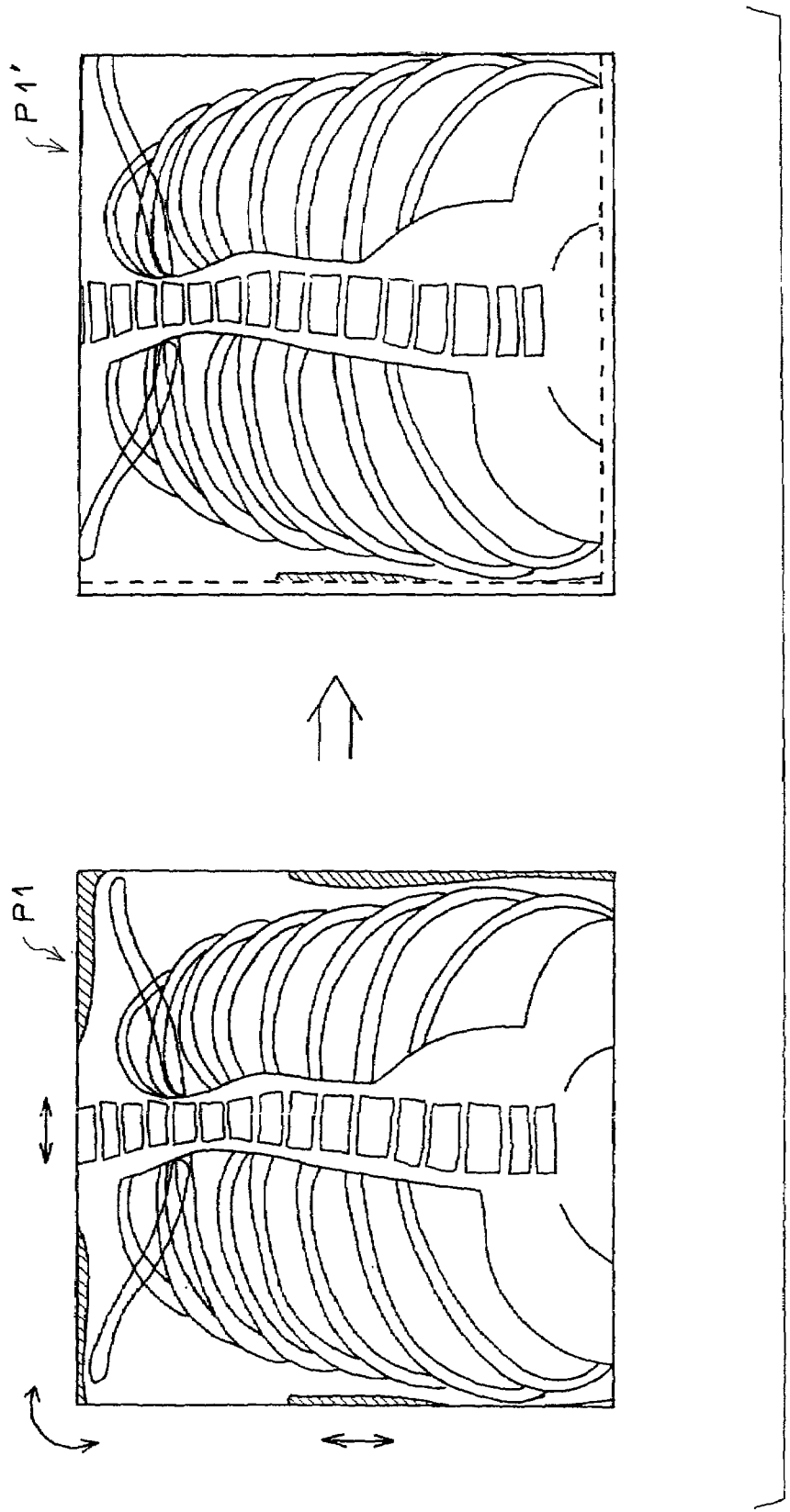

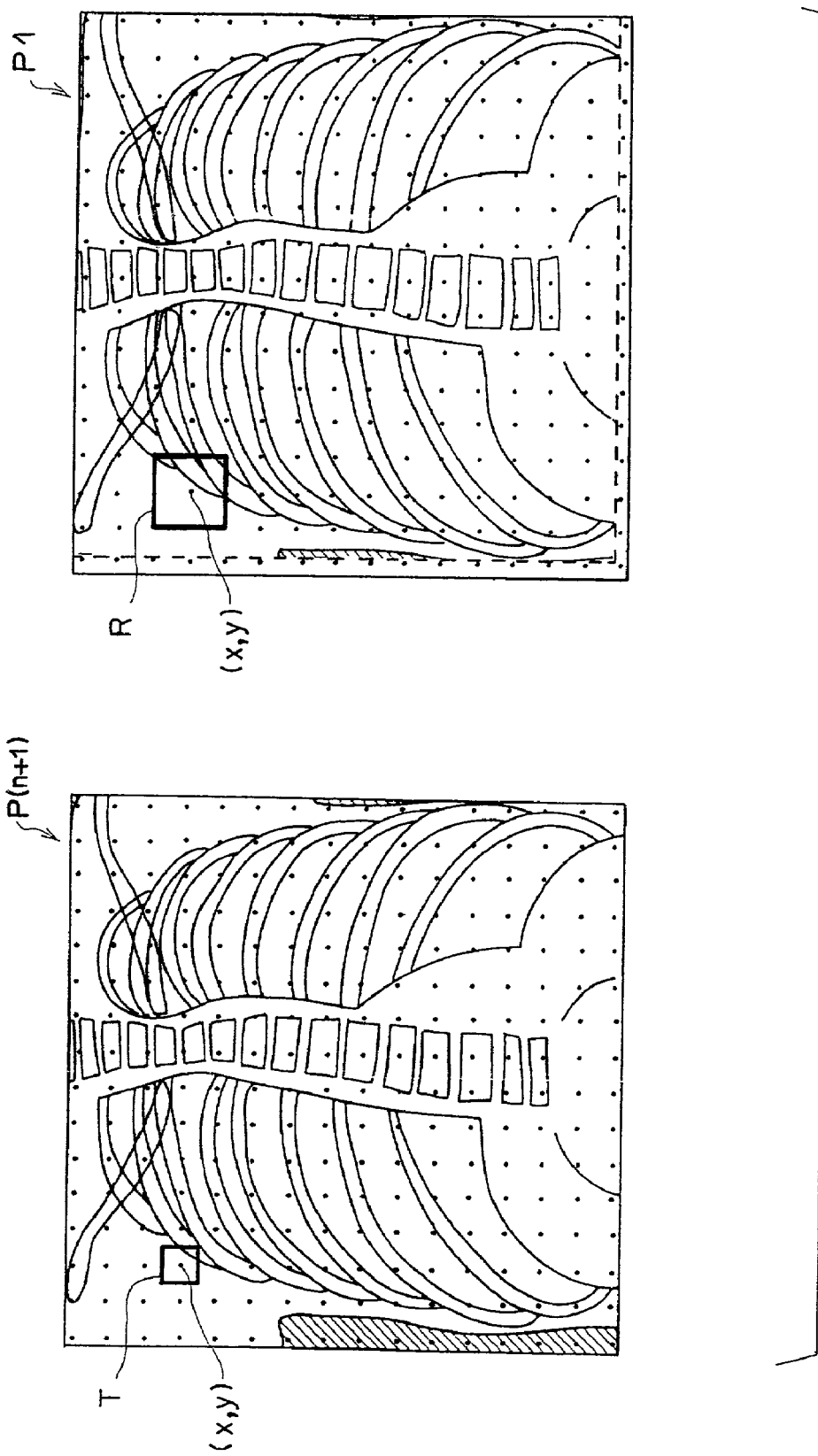

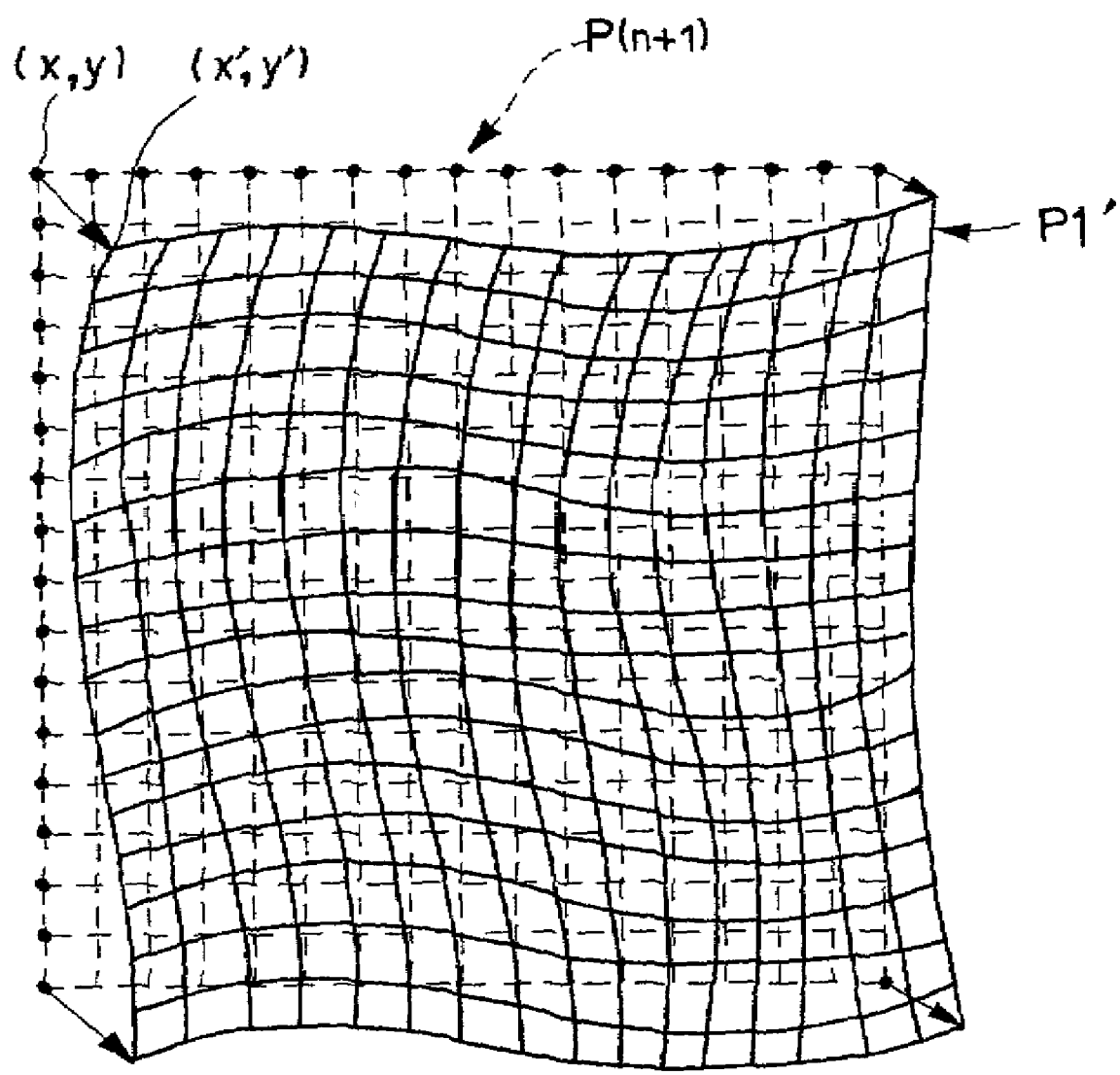

INTER-IMAGE OPERATION APPARATUS AND METHOD AND IMAGE DISPLAY APPARATUS AND METHOD

BACKGROUND OF THE INVENTION

1. Field of the Invention

The present invention relates to an inter-image operation method and an inter-image operation apparatus for carrying out an inter-image operation, and to an image display method and an image display apparatus for displaying an image obtained by using the above inter-image operation method or apparatus. More specifically, the present invention relates to an improved method and apparatus for carrying out an operation between two or more sets of base image data each representing a distinct base image of an identical object, and to an improved method and apparatus for displaying an image obtained by using the above method or the apparatus for carrying out the operation.

2. Description of the Related Art

The technique of comparing two or more base images of an identical object has been used in various fields to discover differences between those base images for, e.g., examining the object based on the differences.

For example, in the field of manufacture, the above technique has been used to search those portions of a product where improvement in endurance is desired by comparing two base images, one being an image of a new product and the other being an image of the same product after an endurance test, and determining those portions where great differences are observed between the two base images. In the medical field, as another example, the technique has been used by doctors to follow progress of disease or stages of a cure and plan the most suitable course of treatment by comparing a plurality of radiation images of the same diseased part of a patient taken at different points in time.

When using the technique of comparing two or more base images as is used on a daily basis in various fields, those two or more base images are often displayed on an image display etc. or outputted onto a film or the like using a printer. Before displaying or outputting the images, the images are converted to image density signals or luminance signals.

The two or more base images themselves may be displayed or outputted simply in a row or a column for comparison. However, the point of the greatest interest for the examiner is the difference between the base images, and it would be difficult for the examiner to discover a minor difference watching the base images themselves displayed or outputted in a row or a column.

In this respect, to improve the efficiency of image comparison, there has been a commonly-used method of extracting and enhancing the difference between two or more base images by matching positions in the base images and conducting inter-image operations including a subtraction operation between the images (see, for example, Japanese Patent Application No. 11(1999)-342900). Such a method of extracting and enhancing the difference between the base images helps the examiner recognize the difference accurately and avoid the risk of overlooking the progress or cure of the diseased portion.

However, the inter-image operation as described above is generally a quite time-consuming operation because it consists of a series of operations (e.g., position-matching operations) between a number of pixels. Moreover, although the image obtained through the inter-image operation (hereinafter, referred to as a processed image) is often used repeatedly in the course of treatment, the image has usually been recalculated upon each diagnosis. Thus, the examiner has been required to wait for a certain time in each diagnosis until the processed image appears on the image display etc., and such a situation has been an obstacle to efficient diagnosis.

SUMMARY OF THE INVENTION

One object of the present invention is to provide an inter-image operation method and an inter-image operation apparatus for carrying out an inter-image operation, the method and the apparatus working effectively in improving efficiency of outputting a processed image obtained through an inter-image operation between two or more base images to be compared of an identical object. Another object of the present invention is to provide an improved image display method and apparatus for displaying the processed image obtained by using the above inter-image operation method or apparatus.

The inter-image operation method and apparatus of the present invention record history data on the past inter-image operations and output the required processed image effectively and appropriately referring to the history data.

Accordingly, an inter-image operation method according to the present invention comprises the steps of carrying out an inter-image operation between two or more sets of base image data each representing a distinct base image of an identical object to obtain processed image data therefrom, and recording history data on past inter-image operations.

The object of the images herein is not limited to the human body but may be of any kind including an animal, a plant, an industrial product, a landform, a celestial body or a landscape.

The inter-image operation preferably includes a subtraction operation on a pixel-by-pixel basis between the two or more sets of the base image data. The subtraction operation may be either of a simple subtraction operation or a weighted subtraction operation. A processed image obtained through such a subtraction operation is generally referred to as a subtraction image. The subtraction image may be, for example, an energy subtraction image derived through a simple subtraction operation or a weighted subtraction operation between two original images (i.e., a high energy image (or a normal radiation image) and a low energy image (or a restrained radiation image taken with radiation of restrained energy)) which are taken at substantially the same point in time but have energy distributions different from each other, a temporal subtraction image derived from two original images taken at different points in time, or a DSA image (digital subtraction angiography image) derived from two original images of a certain blood vessel taken before and after injection of a contrast medium. In addition, it is desirable to carry out a preliminary operation such as a position-matching operation before carrying out the subtraction operation. The position-matching operation is preferably carried out by matching the positions of an anatomical feature area (e.g., an upper end portion of the lung) in the two or more base images.

Each of the two or more sets of the base image data to be processed through the inter-image operation is preferably a set of data representing an original image. The base images may have been taken at different points in time. In addition, each of the two or more sets of the base image data may represent a radiation image for medical use.

The history data on the past inter-image operations may be recorded in a designated recording medium. Instead, the history data may be attached to the processed image data obtained through the inter-image operation, or to each of the two or more sets of the base image data used for calculating the processed image data. It is also possible to use two or more of the above recording methods in parallel.

The history data on the past inter-image operations preferably include such data indicating whether or not the processed image data on a certain processed image have already been obtained. In addition, the history data on the past inter-image operations preferably include information on recording sites of processed image data obtained in the past. Then, if it was found by referring to the history data that the desired set of processed image data had already been obtained, the examiner would not need to conduct the inter-image operation to recalculate the desired set of the processed image data and would have only to fetch and output the desired set of the processed image data stored at the recording site thereof. The time required for fetching and outputting the stored data is generally shorter than the time required for recalculating the processed image, and thus the present method is effective in improving the efficiency of diagnosis.

In the case where the history data is attached to the processed image data, it is more desirable that the history data of the past inter-image operations include information identifying the base images each represented by one of the two or more sets of the base image data used for calculating that processed image data, so that identification of the base images becomes easier and less time-consuming.

An inter-image operation apparatus according to the present invention is designed to carry out the above inter-image operation method according to the present invention, and comprises inter-image operation means which carries out the inter-image operation between two or more sets of base image data each representing a distinct base image of an identical object to obtain processed image data therefrom, and history data recording means for recording history data on past inter-image operations.

The history data recording means may record the history data on the past inter-image operations in a designated recording medium. Instead, the history data recording means may attach the history data on the past inter-image operations to the processed image data obtained through the inter-image operation, or to each of two or more sets of the base image data used for calculating the processed image data. The history data recording means may also use two or more of the above recording methods in parallel.

The history data on the past inter-image operations preferably include such data indicating whether or not the processed image data on a certain processed image have already been obtained. In addition, the history data on the past inter-image operations preferably include information on recording sites of the processed image data already obtained in the past by the inter-image operation means. Then, if the inter-image operation means found by referring to the history data that the desired set of processed image data had already been obtained, the examiner would not need to conduct the inter-image operation to recalculate the desired set of the processed image data and would have only to fetch and output the desired set of the processed image data stored at the recording site thereof. The time required for fetching and outputting the stored data is generally shorter than the time required for recalculating the processed image, and thus the present apparatus works effectively in improving the efficiency of diagnosis.

In the case where the history data is attached to the processed image data, it is more desirable that the history data on the past inter-image operations include information identifying the base images each represented by one of the two or more sets of the base image data used for calculating that processed image data, so that identification of the base images becomes easier and less time-consuming.

Now, exemplary items of the history data and examples of the recording site will be shown in the lists below.

Exemplary Items of History Data

The history data may include:

(1) data indicating whether or not a certain inter-image operation has already been done, (2) information identifying the two or more base images used in the inter-image operation, e.g., names or file names for the two or more sets of base image data, the name of the patient, the date of taking the two or more base images, an ID number or name of a photographed portion of the patient, (3) information identifying the already-obtained processed image data, e.g., a name or file name for the processed image data, the name of the patient, the date of carrying out the inter-image operation, the ID number or name of photographed portions of the patient, (4) information on the recording sites of the two or more sets of base image data used in the inter-image operation or the recording site of the processed image data, (5) data providing detail of the inter-image operation which may include, in the case of the subtraction operation, a size and position for each ROI, the number of ROIs, target recognition results, etc., (6) data providing detail of post-processing applied to the processed image, e.g., image density conversion characteristics, contrast of the image, brightness of the image, degree of dynamic range compression or sharpness of the image, and (7) information on the number or detail of a series of processed images (e.g., temporal subtraction images) for the identical patient or base images thereof (e.g., base images taken at different points in time).

Examples of Recording Site (A) The history data may be recorded in the designated recording medium. Any of the exemplary items (1)-(7) listed above may be recorded in this style.

(B) The history data may be attached to the processed image data (wherein the designated recording medium may be used in parallel). The exemplary items (2), (4) (only if the information on the recording sites of the two or more sets of base image data were included), (5), (6) and (7) may be recorded in this style.

(C) The history data may be attached to each of two or more sets of base image data representing the base images to be processed through the inter-image operation (wherein the designated recording medium may be used in parallel). Any of the exemplary items (1)-(7) may be recorded in this style. Note that the exemplary item (2) or (4) would only include information identifying the paired base image or information on the recording site of the paired base image, respectively, in this case.

The inter-image operation carried out by the inter-image operation means preferably includes a subtraction operation on a pixel-by-pixel basis between the two or more sets of the base image data.

Each of the two or more sets of the base image data to be processed through the inter-image operation may represent a radiation image for medical use. In addition, each of the two or more sets of the base image data is preferably a set of data representing an original image. The base images are preferably, but not limited to, images taken at different points in time. Instead, the original images may be two or more images which are taken at substantially the same point in time but have energy distributions different from each other (i.e., the images used for deriving an energy subtraction image), or may be two original images of a certain blood vessel taken before and after injection of a contrast medium (i.e., the images used for deriving a DSA image).

According to the inter-image operation method and apparatus of the present invention, a desired set of the processed image data obtained in the past may be fetched and outputted at any time by referring to the recorded history data.

That is to say, the examiner may check whether or not the desired processed image data has already been obtained by referring to the recorded history data at any time, and may replace the costly step of recalculating the desired processed image data with a simple step of fetching the desired processed image data if it was found that the desired processed image data had already been obtained. Thus, it becomes possible to output the desired processed image effectively and appropriately. Concurrently, in the case where it was found that the desired processed image data had not been obtained yet, it is also possible to calculate the desired processed image data through the inter-image operation and store the calculated processed image data together with the history data thereof.

In addition, it helps the examiner easily identify the base images and record the information identifying the base images as a part of the history data.

The data providing the detail of the inter-image operation would, when chosen as an item of the history data, enable the examiner to carry out an experimental inter-image operation choosing a set of parameters different from that for the already-obtained processed image and check the result. Accordingly, it becomes much easier for the examiner to obtain a variety of reference images or to determine the most appropriate set of parameters.

The image display method and apparatus of the present invention display the processed image obtained by using the above inter-image operation method or apparatus on a display together with the history data such as the information identifying the two or more base images thereof. That is to say, the image display method and apparatus of the present invention help the examiner recognize the base images etc. of the processed image by providing the examiner with the history data on the processed image immediately and effectively.

Accordingly, an image display method according to the present invention comprises the steps of displaying an image on a prescribed image display, the image being a processed image represented by processed image data obtained using the above inter-image method or apparatus, and displaying information identifying the two or more base images used in the inter-image operation together with the processed image.

An image display apparatus according to the present invention comprises means for displaying an image on a prescribed image display, the image being a processed image represented by processed image data obtained using the above inter-image operation method or apparatus, and means for displaying information identifying the two or more base images used in the inter-image operation together with the processed image.

According to the image display method and apparatus of the present invention, the processed image obtained by using the above inter-image operation method or apparatus is displayed together with the history data including the information identifying the two or more base images used for the inter-image operation. That is to say, the image display method and apparatus of the present invention help the examiner identify the base images etc. of the processed image by providing the examiner with the history data on the processed image immediately and effectively.

BRIEF DESCRIPTION OF THE DRAWINGS

FIG. 4 illustrates the concept of a global matching operation, FIG. 5 illustrates the concept of a local matching operation, FIG. 6 illustrates the concept of a non-linear warping transform operation.

DESCRIPTION OF THE PREFERRED EMBODIMENTS

Now, embodiments of the inter-image operation method and apparatus according to the present invention will be described with reference to the accompanying drawings.

Figure 1:
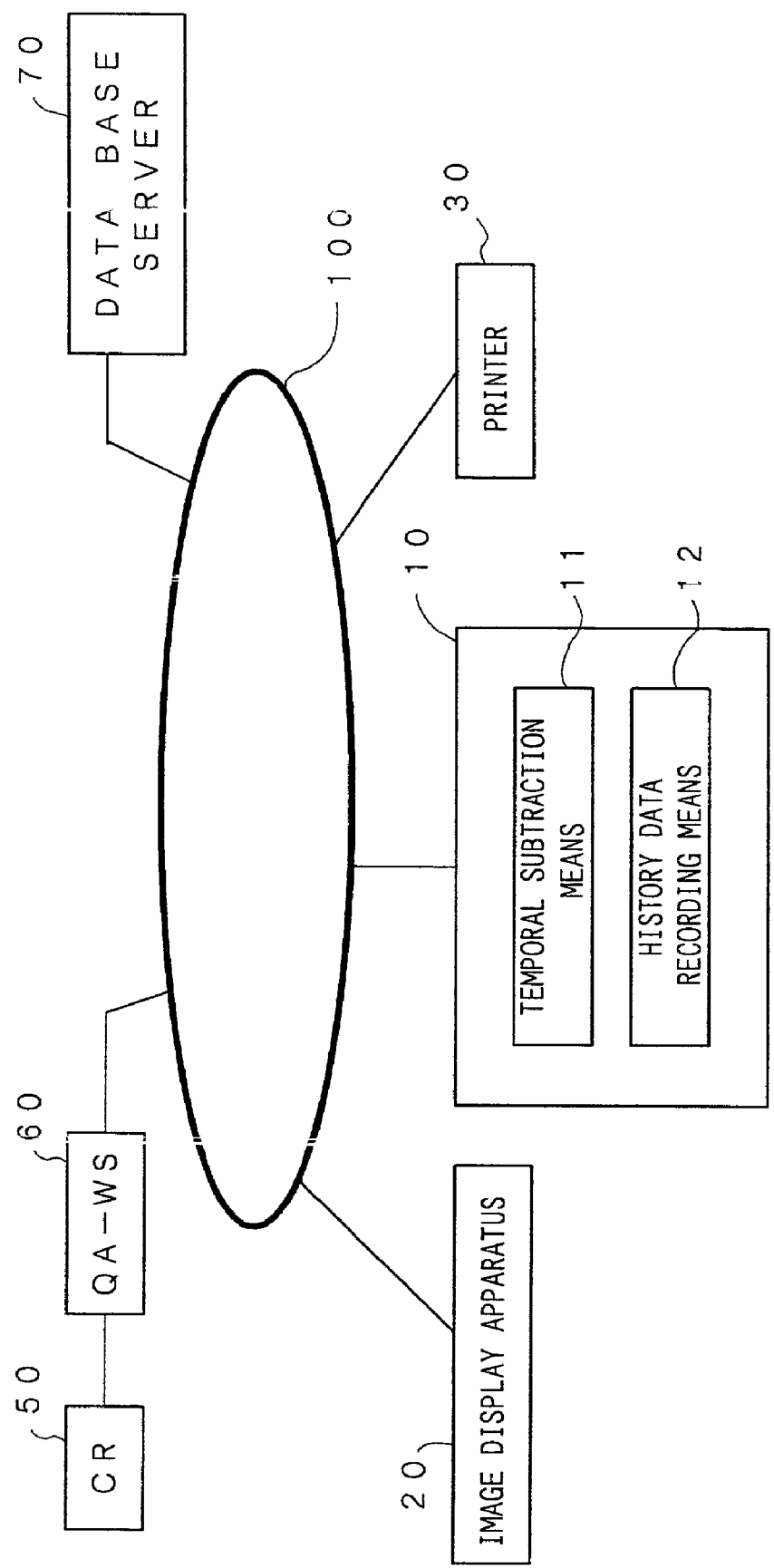
FIG. 1 illustrates one embodiment of an inter-image operation apparatus according to the present invention.

FIG. 1 illustrates a medical image network 100 including an inter-image operation apparatus 10 which is one embodiment of the inter-image operation apparatus according to the present invention.

Connected to the network 100 shown in FIG. 1 are one or more image generating apparatuses for generating medical images such as a CT (computerized tomography) apparatus, an MRI (magnetic resonance imaging) apparatus and a CR (computer radiography) apparatus 50, a database server 70 for storing diagnostic medical images of any kind generated by the image generating apparatuses, an image display apparatus 20 for displaying those images stored in the database server 70 or those images sent directly from the image generating apparatuses, the inter-image operation apparatus 10 equipped with temporal subtraction means 11 (i.e., one form of inter-image operation means) for conducting a temporal subtraction operation between two or more sets of inputted base image data to obtain a temporal subtraction image (i.e., one form of processed image), and so on. A printer 30 or a similar device (not shown) is also connected to the network 100 to output the images handled in the network 100 onto a film etc.

The CR apparatus 50 is an apparatus for obtaining an image of radiation which has passed through the object as a digital image, by having the radiation which has passed through the object project onto an accumulation phosphor sheet comprising a stimulable phosphor layer so that the radiation image of the object is recorded on the accumulation phosphor sheet, and photoelectrically reading the light emitted from the accumulation phosphor sheet exposed to a laser beam, wherein the amount of light emitted from the accumulation phosphor sheet is in proportion to the amount of radiation energy stored thereon. The CR apparatus of such a kind has been widely used in a variety of medical institutions such as hospitals.

A QA-WS (image quality analyzing workstation) 60 connected between the CR apparatus 50 and the network 100 is a workstation having several functions, including a function of checking the diagnostic medical image generated by the image generating apparatus such as the CR apparatus 50 described above and a function of sending a request to the image generating apparatus (e.g., the CR apparatus 50) to re-obtain the image when necessary. The QA-WS 60 as used in the present embodiment displays a digital image P generated by the CR apparatus 50 before storing the image in the database server 70 to enable the examiner to carry out preliminary check of image quality (e.g., image density and image contrast), extent of the image and so on.

The image display apparatus 20 has several functions including not only a simple display function of displaying the image inputted via the network 100 as a visible image but also a function as a terminal for inputting a request for, e.g., the subtraction operation between two or more base images P of the same diseased portion of the same patient which are taken at different points in time.

The inter-image operation apparatus 10 is equipped with the temporal subtraction means 11, as described above, and history data recording means 12 for recording history data on the temporal subtraction image calculated by the temporal subtraction means. To explain more specifically, the history data recording means puts the history data on the calculated temporal subtraction image into the database server 70 for storage and concurrently attaches the same history data to the calculated temporal subtraction image data, wherein the history data may include information identifying the two or more base images, the date of calculating the temporal subtraction image, the ID number of the patient, the name of the photographed portion of the patient, the photographing angle of the patient, etc. In the present embodiment, the history data is attached to the temporal subtraction image data as a header thereof. However, the history data may instead be attached as a separated history data file. In addition, the history data may also be attached to each of the two or more sets of base image data.

The temporal subtraction means 11 searches through the history data recording means 12 when receiving the request for calculating a certain temporal subtraction image from the image display apparatus 20. Then, if it was found that the requested temporal subtraction image had already been obtained in the past, the temporal subtraction means 11 would fetch the data on that subtraction image from the database server 70 referring to the header thereof and output that subtraction image on the image display apparatus 20 instead of recalculating the data on the requested subtraction image. On the other hand, if it was found that the requested temporal subtraction image had not been obtained yet, the temporal subtraction means 11 would calculate the data on the requested temporal subtraction image and output that subtraction image on the image display means. At the same time, the temporal subtraction means 11 would also send the calculated data on the temporal subtraction image to the database server 70 for storage. Concurrently, the history data recording means 12 would attach the history data to the calculated data on the temporal subtraction image and also send the same history data to the database server 70 for storage.

Now, functions of the inter-image operation apparatus 10 will be explained in detail in the following.

It is assumed herein that radiation images P1, P2, . . . , Pn of the chest part of a certain patient were taken in advance using the CR apparatus 50, went through the check at the QA-WS 60, were sent to the database server 70 via the network 100, and have been stored in the database server 70. An image Pi with a newer index represents an older base image. Also stored in the database server 70 are temporal subtraction images Psu1, Psu2, . . . , Psu(n−1) calculated by the temporal subtraction means 11 by conducting the temporal subtraction operation between the newest base image Pn and each of older base images P1, P2, . . . , P(n−1), wherein the temporal subtraction image Psu(i) stands for the temporal subtraction image between Pn and Pi.

The following describes how the inter-image operation apparatus 10 functions when a request for displaying the first base image P1 and the first temporal subtraction image Psu1 (i.e., the temporal subtraction image between P1 and Pn) is made at the image display apparatus 20.

The request made at the image display apparatus 20 is sent to the temporal subtraction means 11 in the inter-image operation apparatus 10 via the network 100. Then the temporal subtraction means 11 searches for the history data on the desired temporal subtraction image Psu1 through the database server 70.

In the present embodiment, the first temporal subtraction image Psu1 has already been obtained and stored in the database server 70 and thus the history data thereon can be found in the database server 70. Thus, the temporal subtraction means 11 fetches the first temporal subtraction image Psu1 from the database server 70 referring to the header (i.e., the history data) thereof, and sends the first temporal subtraction image Psu1 to the image display apparatus 20 for output via the network 100. Concurrently, the temporal subtraction means 11 also fetches the first base image P1, which has also been stored in the database 70, and sends the first base image P1 to the image display apparatus 20 for output.

The examiner can now examine the first base image P1 and the first subtraction image Psu1 displayed together on a display portion of the image display apparatus 20. The image display apparatus 20 preferably has means for displaying on the display portion the information identifying two base images used for deriving the first subtraction image Psu1 (i.e., the first base image P1 and the nth base image Pn), together with the first subtraction image Psu1 itself. The image display apparatus 20 having such means is one of the preferred embodiments of the image display apparatus according to the present invention.

In the manner described above, the inter-image operation apparatus 10 of the present invention enable the examiner to check whether or not the desired subtraction image Psu has already been obtained by referring to the recorded history data, and to replace the costly step of recalculating the desired subtraction image with a simple step of fetching the data on the desired subtraction image from the database 70 if it was found that the desired subtraction image had already been obtained.

Now, the following describes how the inter-image operation apparatus 10 functions when a request for displaying the (n+1)th base image P(n+1) and the nth temporal subtraction image Psu(n) (i.e., the temporal subtraction image between P1 and P(n+1)) is made at the image display apparatus 20 immediately after photographing of the (n+1)th base image P(n+1) by the CR apparatus 50 etc.

In the present embodiment, the (n+1)th base image P(n+1) has already gone through the check at the QA-WS 60 and been sent to the database server 70 via the network 100 for storage. However, the nth temporal subtraction image Psu(n) (i.e., the temporal subtraction image between Pi and P(n+1)) has not been calculated yet, and thus neither the nth temporal subtraction image Psu(n) itself nor the history data thereof is stored in the database 70.

The request for displaying made at the image display apparatus 20 is sent to the temporal subtraction means 11 in the inter-image operation apparatus 10 in the same manner as described above. Then the temporal subtraction means 11 searches for the history data of the desired temporal subtraction image Psu(n) through the database server 70.

As the image Psu(n) is not stored in the database server 70 and thus the temporal subtraction means 11 cannot find the history data of the desired temporal subtraction image Psu(n), the temporal subtraction means 11 calculates the desired nth temporal subtraction image Psu(n). The process of calculating the nth temporal subtraction image Psu(n) carried out by the temporal subtraction means 11 will be described in detail in the following.

Figure 2B:
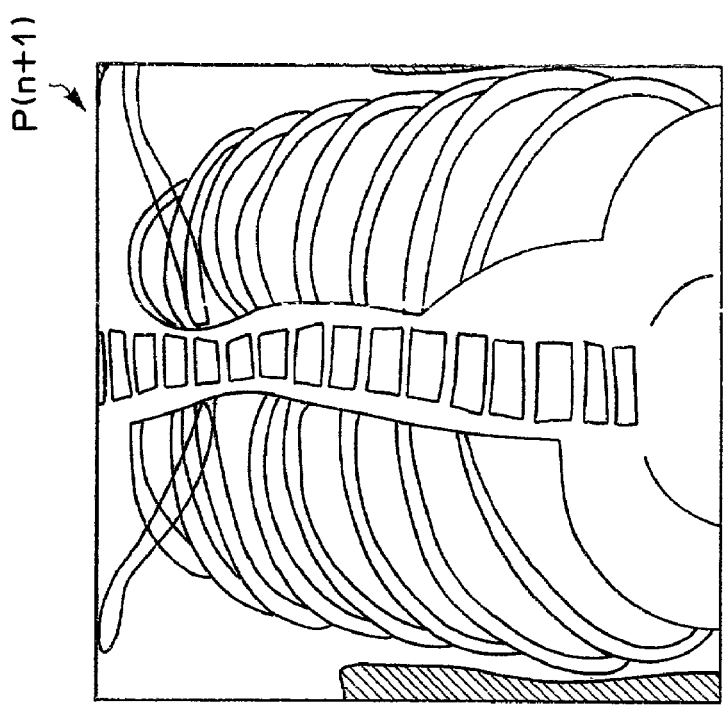
FIGS. 2A and 2B show an example of a pair of original images used by the apparatus shown in FIG. 1 to derive a temporal subtraction image, FIG. 3 schematically illustrates an overall process of temporal subtraction.
Figure 2A:
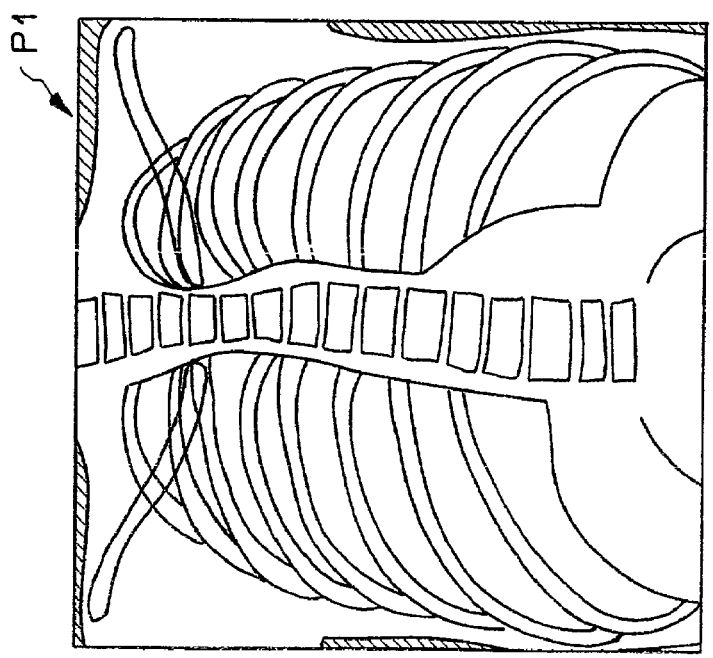

First of all, the temporal subtraction means 11 fetches the data on the (n+1)th base image P(n+1) and the data on the first base image P1 from the database server 70 (see FIGS. 2A and 2B).

As shown in FIGS. 2A and 2B, accurate positions of the target object (i.e., the chest part in the present embodiment) in the images P1 and P(n+1) hardly match with each other. Therefore, there is a risk of incorrect subtraction between different organs, e.g., between a bone portion and a soft tissues portion, if the subtraction operation was carried out on the pixel-by-pixel basis without performing position-matching.

To avoid this risk, the temporal subtraction means 11 actually conducts the subtraction operation after conducting a position-matching operation as illustrated in FIG. 3.

Thus, the calculation process begins with a global matching operation between the first base image P1 and the (n+1)th base image P(n+1). The global matching operation applies an affine transform operation to the first base image P1 in order to positionally match the first base image P1 to the (n+1)th base image P(n+1), transforming the first base image P1 to a first image P1' as shown in FIG. 4.

Then, the temporal subtraction means 11 divides the (n+1)th base image P(n+1) into a plurality of regions of interest (ROIS) T, in which a pixel in the center of each ROI(T) is represented by a position (x,y) in the x-y coordinate (see FIG. 5). The temporal subtraction means 11 also defines search ROI(R)s in the first image P1'. Each of the search ROI(R)s is defined corresponding to each ROI(T) in the (n+1)th base image P(n+1), and is provided with a position (x,y) which is identical to that of one of the ROI(T)s and an area four times as large as that of each ROI(T) (i.e., each dimension of the area is twice as long as that of each ROI(T)).

The temporal subtraction means 11 next finds a position where the highest degree of matching is obtained between the images P1' and P(n+1) (the position is referred to by (x',y'), representing a matched position of the center of an ROI) for each ROI(R) by moving an ROI(T) defined in the (n+1)th base image P(n+1) within the corresponding research ROI(R) defined in the first image P1' (in other words, the amount of shift is calculated for every ROI based on local matching). A standard value which represents the degree of matching may be a value based on the least square or cross-correlation between the two images.

Illustrated in FIG. 6 is the amount of shift ($\Delta x$, $\Delta y$) (wherein $\Delta x=x'-x$ and $\Delta y=y'-y$) between the two images P1' and P(n+1) derived for each pixel (x,y) in the center of an ROI in the manner described above. Then, approximation is carried out using a two-dimensional tenth-order polynomial to re-calculate the amount of shift ($\Delta x$, $\Delta y$) to be applied to each pixel in the first image P1 from each amount of shift ($\Delta x$, $\Delta y$) for each pixel (x,y) derived based on local matching. A non-linear warping transform operation (hereinafter, referred to simply as the warping operation) is then applied to the first image P1' to shift the position of each pixel (x,y) in the first image P1' in accordance with the re-calculated amount of shift ($\Delta x$, $\Delta y$) for the pixel.

Figure 7C:
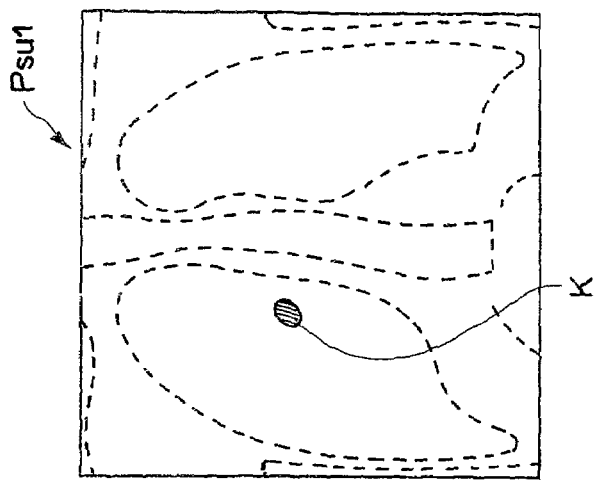
FIGS. 7A, 7B and 7C show an example of a first transformed image P1", an (n+1)th original image P(n+1) and a first subtraction image Psu1, respectively.
Figure 7B:
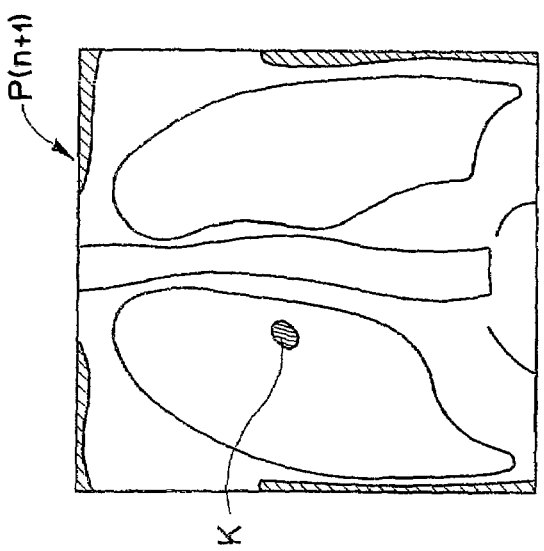
Figure 7A:
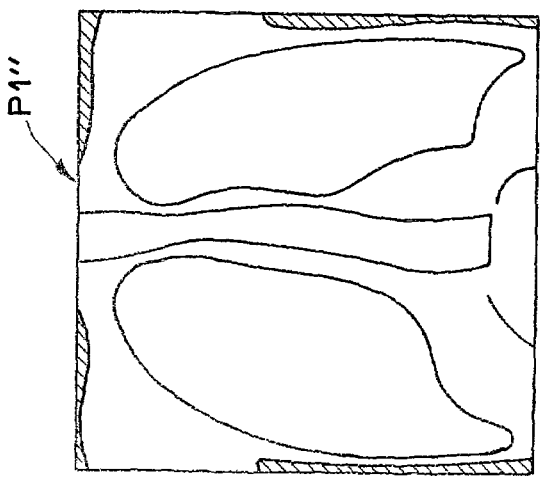

Positions of organs in a first transformed image P1" obtained by warping the first image P1' match quite well to the positions of organs appearing in corresponding pixels in the (n+1)th base image P(n+1) (see FIG. 7A and 7B). A temporal subtraction image Psu1 (see FIG. 7C), which contains very few artifacts due to unmatched borders between the organs, is derived by subtracting first transformed image P1" from the (n+1)th base image P(n+1) on a pixel-by-pixel basis. Emerging clearly in the temporal subtraction image Psu1 is a diseased portion K in the left lung, which does not exist in the first base image P1 but exists in the (n+1)th base image P(n+1).

Once the temporal subtraction image Psu1 is obtained, the history data recording means 12 attaches the history data (e.g., the date of calculating the image Psu1 or information identifying the base images PI and P(n+1) for the temporal subtraction image Psu1) to the data on the image Psu1 as a header thereof and sends the image Psu1 to the database server 70 via the network 100 for storage. On the other hand, the obtained temporal subtraction image Psu1 is also sent to the image display apparatus 20 and displayed on the display portion thereof together with the first base image P1 and the (n+1)th base image P(n+1). The examiner can now examine those three images visually on the display portion.

The history data recording means 12 also adds the history data, the data identical to those attached to the data on the temporal subtraction image Psu1, to a history data file in the database server 70. Thus, the examiner may easily check whether or not the temporal subtraction image Psu1 has already been obtained by searching through the history data file in the database server 70 whenever necessary.

In summary, the inter-image operation apparatus 10 of the present embodiment outputs a required processed image derived from two or more base images of an identical object to be compared (e.g., a temporal subtraction image) in a manner much more efficient than the conventional one.

Although the temporal subtraction means 11 in the embodiment described above practices the local matching operation after applying the global matching operation to at least one image, the temporal subtraction means 11 may instead practice only the local matching operation skipping the global matching operation. In addition, although the transform operations (e.g., the affine transform operation and the non-linear warping transform operation) are applied only to the first base image PI in the embodiment described above, such transform operations may also be applied to the (n+1)th base image P(n+1).

Further, although the inter-image operation apparatus 10 is a separated apparatus in the above embodiment, the function thereof may instead be incorporated in the QA-WS 60 or the image display apparatus 20.

In addition, although the temporal subtraction images, the images obtained through a process described mainly in Japanese Unexamined Patent Publication No. 7(1995)-37074, are selected as the images to be calculated by the inter-image operation apparatus 10 in the above embodiment, images of other types can also be obtained using the inter-image operation apparatus and method according to the present invention. In other words, an image of any kind may be calculated as long as base images required for calculating the desired image exist. A set of images to be displayed on the image display apparatus 20 may also be of any kind, e.g., a set including two original images (one high energy image and one low energy image) which are taken at substantially the same point in time but have energy distributions different from each other and an energy subtraction image derived therefrom, or a set including two original images of a blood vessel taken before and after injection of a contrast medium and a DSA image derived therefrom. More generally, any set of images may be selected as the images to be displayed together on the image display apparatus 20 as long as the set contains two or more images of the identical object to be compared, whether or not the object is a living body.

Further, although the examiner is required to specify two base images related with the desired inter-image operation according to the above embodiment, the inter-image operation apparatus 10 may instead prompt the examiner to specify only one base image and search for those headers indicating the same patient ID number, name of the photographed portion and photographing angle as those of the specified base image. In that case, the inter-image operation apparatus 10 may calculate a temporal subtraction image between the specified base image and each image fetched from the database server 70 referring to the header thereof.

In addition, the patient ID etc. may be inputted at the CR apparatus 50 upon photographing to cause the inter-image operation apparatus 10 to conduct the job of searching for necessary base images through the database server 70 as a job parallel to the photographing job carried out by the CR apparatus 50. This enables the inter-image operation apparatus 10 to carry out the desired inter-image operation between a new image and each of the base images fetched from the database 70 immediately after photographing of the new image, and to send each processed image obtained through the desired inter-image operation to the database server 70 for storage with the history data attached thereto. Such a style advantageously automates the processes of calculating and recording the processed image.

The image display apparatus 20 may be configured to display a message notifying that the specified inter-image operation is invalid in the case where the required set of base images is not found in the database server 70.

The image display apparatus 20 may display the images in any display style. For example, two base images and one temporal subtraction image derived therefrom may be displayed together. Alternatively, either of a base image taken in the past or a subtraction image derived from that base image and the newest base image may be displayed alternately together with the newest base image. It is always preferable to display the processed image together with the information identifying the base images thereof (e.g., file numbers of the base image files).

In the case where the images are outputted onto a film etc. by the printer 30, the display style should be preferably adjusted in accordance with the size of the film, resolution of the printer 30, etc. For example, it is desirable to arrange the images in rows on the film in the case where the film is wide. On the other hand, it is better to arrange the images in columns in the case where the film is long.

In addition, various items of the history data and recording sites thereof may preferably be selected. Listed below are possible examples thereof.

Exemplary Items of History Data

The history data may include:

(1) data indicating whether or not a certain inter-image operation has already been done, (2) information identifying the two or more base images used in the inter-image operation, e.g., names or file names for the two or more sets of base image data, the name of the patient, the date of taking the two or more base images, an ID number or name of a photographed portion of the patient, (3) information identifying the already-obtained processed image data, e.g., a name or file name for the processed image data, the name of the patient, the date of carrying out the inter-image operation, the ID number or name of photographed portions of the patient, (4) information on the recording sites of the two or more sets of base image data used in the inter-image operation or the recording site of the processed image data, (5) data providing detail of the inter-image operation which may include, in the case of the subtraction operation, a size and position for each ROI, the number of ROIs, target recognition results, etc., (6) data providing detail of post-processing applied to the processed image, e.g., image density conversion characteristics, contrast of the image, brightness of the image, degree of compression or sharpness of the image, and (7) information on the number or details of a series of processed images (e.g., temporal subtraction images) for the identical patient or base images thereof (e.g., base images taken at different points in time).

Examples of Recording Site (A) The history data may be recorded in the designated recording medium. Any of the exemplary items (1)-(7) listed above may be recorded in this style.

(B) The history data may be attached to the processed image data (wherein the designated recording medium may be used in parallel). The exemplary items (2), (4) (only if the information on the recording sites of the two or more sets of base image data were included), (5), (6) and (7) may be recorded in this style.

(C) The history data may be attached to each of two or more sets of base image data representing the base images to be processed through the inter-image operation (wherein the designated recording medium may be used in parallel) Any of the exemplary items (1)-(7) may be recorded in this style. Note that the exemplary item (2) or (4) would only include information identifying the paired base image or information on the recording site of the paired base image, respectively, in this case.

What is claimed is:

1. An inter-image operation method comprising the steps of:
    carrying out an inter-image operation between two or more sets of base image data each representing a distinct base image of an identical object to obtain processed image data therefrom;
    recording history data on past inter-image operations; and
    storing the two or more sets of base image data and attaching the history data to the stored two or more sets of base image data;
    wherein the history data is subtraction processing history data;
    wherein attaching the history data to stored two or more sets of base image data comprises appending the history data to the two or more sets of base image data as header data.

2. An inter-image operation method according to claim 1, wherein the history data on the past inter-image operations are recorded in a designated recording medium.

3. An inter-image operation method according to claim 1, wherein the history data on the past inter-image operations are also attached to the processed image data obtained through the inter-image operation.

4. An inter-image operation method according to claim 1, wherein the history data on the past inter-image operations include information identifying the base images each represented by one of said two or more sets of the base image data used for calculating the processed image data.

5. An inter-image operation method according to claim 4, wherein the history data on the past inter-image operations are recorded in a designated recording medium.

6. An inter-image operation method according to claim 4, wherein the history data on the past inter-image operations are also attached to the processed image data obtained through the inter-image operation.

7. An inter-image operation method according to claim 4, wherein the history data on the past inter-image operations include such data indicating whether or not the processed image data on a certain processed image have already been obtained.

8. An inter-image operation method according to claim 7, wherein the history data on the past inter-image operations are recorded in a designated recording medium.

9. An inter-image operation method according to claim 7, wherein the history data on the past inter-image operations are also attached to the processed image data obtained through the inter-image operation.

10. An inter-image operation method according to claim 7, wherein the history data on the past inter-image operations include information on recording sites of the processed image data obtained in the past, and wherein a desired set of the processed image data stored at the recording site thereof is fetched and outputted instead of conducting the inter-image operation to recalculate the desired set of the processed image data, if it was found by referring to the history data that the desired set of processed image data had already been obtained.

11. An inter-image operation method according to claim 10, wherein the history data on the past inter-image operations are recorded in a designated recording medium.

12. An inter-image operation method according to claim 10, wherein the history data on the past inter-image operations are also attached to the processed image data obtained through the inter-image operation.

13. An inter-image operation method according to claim 1, wherein the history data on the past inter-image operations include such data indicating whether or not the processed image data on a certain processed image have already been obtained.

14. An inter-image operation method according to claim 13, wherein the history data on the past inter-image operations are recorded in a designated recording medium.

15. An inter-image operation method according to claim 13, wherein the history data on the past inter-image operations are also attached to the processed image data obtained through the inter-image operation.

16. An inter-image operation method according to claim 13, wherein the history data on the past inter-image operations include information on recording sites of the processed image data obtained in the past, and wherein a desired set of the processed image data stored at the recording site thereof is fetched and outputted instead of conducting the inter-image operation to recalculate the desired set of the processed image data, if it was found by referring to the history data that the desired set of processed image data had already been obtained.

17. An inter-image operation method according to claim 16, wherein the history data on the past inter-image operations are recorded in a designated recording medium.

18. An inter-image operation method according to claim 16, wherein the history data on the past inter-image operations are also attached to the processed image data obtained through the inter-image operation.

19. An inter-image operation method according to claim 1, wherein the inter-image operation includes a subtraction operation on a pixel-by-pixel basis between said two or more sets of the base image data.

20. An inter-image operation method according to claim 1, wherein each of said two or more sets of the base image data is a set of data representing an original image.

21. An inter-image operation method according to claim 1, wherein the inter-image operation includes a subtraction operation on a pixel-by-pixel basis between said two or more sets of the base image data, and wherein each of said two or more sets of the base image data is a set of data representing an original image.

22. An inter-image operation method according to claim 1, wherein the base images each represented by one of said two or more sets of the base image data are taken at different points in time.

23. An inter-image operation method according to claim 1, wherein the inter-image operation includes a subtraction operation on a pixel-by-pixel basis between said two or more sets of the base image data, and wherein the base images each represented by one of said two or more sets of the base image data are taken at different points in time.

24. An inter-image operation method according to claim 1, wherein each of said two or more sets of the base image data represents a radiation image for medical use.

25. An inter-image operation method according to claim 1, wherein the inter-image operation includes a subtraction operation on a pixel-by-pixel basis between said two or more sets of the base image data, and wherein each of said two or more sets of the base image data represents a radiation image for medical use.

26. An inter-image operation method comprising the steps of:
carrying out an inter-image operation between two or more sets of base image data each representing a distinct base image of an identical object to obtain processed image data therefrom; and
recording history data on past inter-image operations;
wherein the two or more sets of base image data each represent a distinct base image of a patient and wherein the history data comprises one or more of a name of the patient; dates on which the two or more sets of base image data were obtained; an identification number or name of an imaged portion of the patient; and an angle of the imaging of the patient; and
wherein recording history data comprises appending history data to the two or more sets of base image data as header data.

27. An inter-image operation method comprising the steps of
carrying out an inter-image operation between two or more sets of base image data each representing a distinct base image of an identical object to obtain processed image data therefrom; and
recording history data on past inter-image operations;
wherein the two or more sets of base image data each represent a distinct base image of a patient and wherein the history data comprises one or more of a name of the patient; a date on which the inter-image operation is carried out; an identification number or name of an imaged portion of the patient; and an angle of the imaging of the patient;

wherein recording history data comprises appending history data to the two or more sets of base image data as header data.

28. An inter-image operation apparatus comprising
inter-image operation means which carries out an inter-image operation between two or more sets of base image data each representing a distinct base image of an identical object to obtain processed image data therefrom;
history data recording means for recording history data on past inter-image operations;
means for recording the two or more sets of base image data; and
means for attaching the history data to the stored two or more sets of base image data;
wherein the history data is subtraction processing history data;
wherein the history data recording means appends the history data to the two or more sets of base image data as header data.

29. An inter-image operation apparatus according to claim 28, wherein the history data recording means records the history data on the past inter-image operations in a designated recording medium.

30. An inter-image operation apparatus according to claim 28, wherein the means for attaching the history data to the stored two or more sets of base image data also attaches the history data to the processed image data obtained through the inter-image operation.

31. An inter-image operation apparatus according to claim 28, wherein the history data on the past inter-image operations include information identifying the base images each represented by one of said two or more sets of the base image data used for calculating the processed image data.

32. An inter-image operation apparatus according to claim 31, wherein the history data recording means records the history data on the past inter-image operations in a designated recording medium.

33. An inter-image operation apparatus according to claim 31, wherein the means for attaching history data to the stored two or more sets of base image data also attaches the history data to the processed image data obtained through the inter-image operation.

34. An inter-image operation apparatus according to claim 31, wherein the history data on the past inter-image operations include such data indicating whether or not the processed image data on a certain processed image have already been obtained.

35. An inter-image operation apparatus according to claim 34, wherein the history data recording means records the history data on the past inter-image operations in a designated recording medium.

36. An inter-image operation apparatus according to claim 34, wherein the means for attaching the history data to the stored two or more sets of base image data also attaches the history data to the processed image data obtained through the inter-image operation.

37. An inter-image operation apparatus according to claim 34, wherein the history data on the past inter-image operations include information on recording sites of the processed image data obtained in the past, and wherein a desired set of the processed image data stored at the recording site thereof is fetched and outputted instead of conducting the inter-image operation to recalculate the desired set of the processed image data, if the inter-image operation means found by referring to the history data that the desired set of processed image data had already been obtained.

38. An inter-image operation apparatus according to claim 37, wherein the history data recording means records the history data on the past inter-image operations in a designated recording medium.

39. An inter-image operation apparatus according to claim 37, wherein the means for attaching the history data to the stored two or more sets of stored base image data also attaches the history data to the processed image data obtained through the inter-image operation.

40. An inter-image operation apparatus according to claim 28, wherein the history data on the past inter-image operations include such data indicating whether or not the processed image data on a certain processed image have already been obtained.

41. An inter-image operation apparatus according to claim 40, wherein the history data recording means records the history data on the past inter-image operations in a designated recording medium.

42. An inter-image operation apparatus according to claim 40, wherein the means for attaching the history data to the stored two or more sets of base image data also attaches the history data to the processed image data obtained through the inter-image operation.

43. An inter-image operation apparatus according to claim 40, wherein the history data on the past inter-image operations include information on recording sites of the processed image data obtained in the past, and wherein a desired set of the processed image data stored at the recording site thereof is fetched and outputted instead of conducting the inter-image operation to recalculate the desired set of the processed image data, if the inter-image operation means found by referring to the history data, that the desired set of processed image data had already been obtained.

44. An inter-image operation apparatus according to claim 43, wherein the history data recording means records the history data on the past inter-image operations in a designated recording medium.

45. An inter-image operation apparatus according to claim 43, wherein the means for attaching the history data to the stored two or more sets of base image data also attaches the history data to the processed image data obtained through the inter-image operation.

46. An inter-image operation apparatus according to claim 28, wherein the inter-image operation includes a subtraction operation on a pixel-by-pixel basis between said two or more sets of the base image data.

47. An inter-image operation apparatus according to claim 28, wherein each of said two or more sets of the base image data is a set of data representing an original image.

48. An inter-image operation apparatus according to claim 28, wherein the inter-image operation includes a subtraction operation on a pixel-by-pixel basis between said two or more sets of the base image data, and wherein each of said two or more sets of the base image data is a set of data representing an original image.

49. An inter-image operation apparatus according to claim 28, wherein the base images each represented by one of said two or more sets of the base image data are taken at different points in time.

50. An inter-image operation apparatus according to claim 28, wherein the inter-image operation includes a subtraction operation on a pixel-by-pixel basis between said two or more sets of the base image data, and wherein the base images each represented by one of said two or more sets of the base image data are taken at different points in time.

51. An inter-image operation apparatus according to claim 28, wherein each of said two or more sets of the base image data represents a radiation image for medical use.

52. An inter-image operation apparatus according to claim 28, wherein the inter-image operation includes a subtraction operation on a pixel-by-pixel basis between said two or more sets of the base image data, and wherein each of said two or more sets of the base image data represents a radiation image for medical use.

53. The apparatus of claim 28, wherein the history data recording means comprises a database which stores the history data and the base image data.

54. The apparatus of claim 53 wherein the history data includes header information indicating that inter-image operation of the base image data has been carried out.

55. The apparatus of claim 54, wherein the inter-image operation means searches the database by the header information to determine whether the inter-image operation has been carried out, and retrieving the inter-image operation from the database when the header information that the inter-image operation has been carried out to provide the processed image data.

56. The apparatus of claim 55, wherein the inter-image operation means carries out the inter-image operation when the inter-image operation of the base image data has not been previously carried out.

57. The apparatus of claim 28, wherein the history data comprises at least one of: data indicating whether or not inter-image operations of the base image data have been carried out, names for the base image data, a name of a patient of corresponding base image data, a date of taking the base image data, and an ID number of the patient.

58. An inter-image operation apparatus comprising
inter-image operation means which carries out an inter-image operation between two or more sets of base image data each representing a distinct base image of an identical object to obtain processed image data therefrom; and
history data recording means for recording history data on past inter-image operations
wherein the two or more sets of base image data each represent a distinct base image of a patient and wherein the history data comprises one or more of a name of the patient; dates on which the two or more sets of base image data were obtained; an identification number or name of an imaged portion of the patient; and an angle of the imaging of the patient;
wherein the history data recording means appends the history data to the two or more sets of base image data as header data.

59. An inter-image operation apparatus comprising
inter-image operation means which carries out an inter-image operation between two or more sets of base image data each representing a distinct base image of an identical object to obtain processed image data therefrom; and
history data recording means for recording history data on past inter-image operations;
wherein the two or more sets of base image data each represent a distinct base image of a patient and wherein the history data comprises one or more of a name of the patient; a date on which the inter-image operation is carried out; an identification number of name of an imaged portion of the patient; and an angle of the imaging of the patient;
wherein the history data recording means appends the history data to the two or more sets of base image data as header data.

* * * * *